(12) United States Patent
Antheunis et al.

(10) Patent No.: US 9,539,548 B2
(45) Date of Patent: Jan. 10, 2017

(54) DEVICES INCLUDING A MEMBRANE FORMED FROM A CURABLE COMPOSITION

(71) Applicant: Fujifilm Manufacturing Europe B.V., Tilburg (NL)

(72) Inventors: Harro Antheunis, Tilburg (NL); Jacko Hessing, Tilburg (NL); Bastiaan Van Berchum, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 0 days.

(21) Appl. No.: 14/979,779

(22) Filed: Dec. 28, 2015

(65) Prior Publication Data

US 2016/0207008 A1 Jul. 21, 2016

Related U.S. Application Data

(62) Division of application No. 14/603,524, filed on Jan. 23, 2015, now Pat. No. 9,259,685, which is a division of application No. 13/516,429, filed as application No. PCT/GB2010/052063 on Dec. 9, 2010, now Pat. No. 8,968,965.

(30) Foreign Application Priority Data

Dec. 16, 2009 (GB) .................................. 0921951.0

(51) Int. Cl.
| | |
|---|---|
| *B01D 71/26* | (2006.01) |
| *H01M 8/10* | (2016.01) |
| *H01M 8/22* | (2006.01) |
| *B01D 61/44* | (2006.01) |
| *C02F 1/44* | (2006.01) |
| *C08F 220/60* | (2006.01) |
| *B01J 39/20* | (2006.01) |
| *B01J 47/12* | (2006.01) |
| *B01D 67/00* | (2006.01) |
| *C02F 1/469* | (2006.01) |
| *C08J 5/22* | (2006.01) |
| *B01D 61/42* | (2006.01) |
| *H01M 8/02* | (2016.01) |

(52) U.S. Cl.
CPC ............ *B01D 71/26* (2013.01); *B01D 61/422* (2013.01); *B01D 61/44* (2013.01); *B01D 67/0006* (2013.01); *B01J 39/20* (2013.01); *B01J 47/12* (2013.01); *C02F 1/441* (2013.01); *C02F 1/4691* (2013.01); *C02F 1/4693* (2013.01); *C02F 1/4695* (2013.01); *C08F 220/60* (2013.01); *C08J 5/2243* (2013.01); *H01M 8/0239* (2013.01); *H01M 8/103* (2013.01); *H01M 8/1027* (2013.01); *H01M 8/1044* (2013.01); *H01M 8/1048* (2013.01); *H01M 8/1058* (2013.01); *H01M 8/1067* (2013.01); *H01M 8/1072* (2013.01); *H01M 8/227* (2013.01); *B01D 2323/30* (2013.01); *B01D 2323/34* (2013.01); *B01D 2323/345* (2013.01); *B01D 2325/42* (2013.01); *C02F 2201/46* (2013.01); *C08J 2333/26* (2013.01); *H01M 2300/0082* (2013.01); *H01M 2300/0091* (2013.01); *Y02E 60/521* (2013.01); *Y02P 70/56* (2015.11)

(58) Field of Classification Search
CPC ..... B01D 71/26; B01D 61/44; B01D 67/0006; B01D 2323/30; B01D 2323/34; B01D 2325/42; H01M 8/1027; H01M 8/103; H01M 8/1044; H01M 8/1058; H01M 8/1067; H01M 8/1072; H01M 8/227; H01M 8/0239; H01M 2300/0082; H01M 2300/0091; H01M 8/1048; C02F 1/441; C02F 1/4691; C02F 1/4693; C02F 1/4695; C08J 5/2243; C08J 2333/26; C08F 220/60; B01J 39/20; B01J 47/12
USPC .......... 429/498, 492; 521/27, 31; 427/385.5, 427/496, 517, 487; 204/632, 665, 582; 210/500.25
See application file for complete search history.

(56) References Cited

U.S. PATENT DOCUMENTS

| | | | |
|---|---|---|---|
| 4,766,160 A | 8/1988 | Bichon et al. | |
| 4,767,550 A | 8/1988 | Hanlon et al. | |
| 4,968,435 A | 11/1990 | Neff et al. | |
| 5,037,858 A | 8/1991 | MacDonald | |
| 5,593,576 A | 1/1997 | Girot et al. | |
| 5,935,429 A | 8/1999 | Liao et al. | |

(Continued)

FOREIGN PATENT DOCUMENTS

| | | | |
|---|---|---|---|
| JP | S58101120 A | 6/1983 | |
| JP | WO 2005076396 A1 * | 8/2005 | ............. H01B 1/122 |

(Continued)

*Primary Examiner* — Michael M Bernshteyn
(74) *Attorney, Agent, or Firm* — Banner & Witcoff, Ltd.

(57) ABSTRACT

A device selected from the group consisting of an electrodialysis or reverse electrodialysis unit, an electrodeionization module and a flow through capacitor, the device comprising a membrane obtained from a process comprising the following steps: applying a curable composition to a support; and curing the composition to form a membrane; wherein the curable composition comprises:
 (i) 2.5 to 50 wt % crosslinker comprising at least two acrylamide groups;
 (ii) 12 to 65 wt % curable ionic compound comprising an ethylenically unsaturated group and a cationic group;
 (iii) 10 to 70 wt % solvent;
 (iv) 0 to 10 wt % of free radical initiator; and
 (v) non-curable salt comprising a cation and an anion, wherein the anion is not sulfate; wherein the molar ratio of (i):(ii) is greater than 0.10 and less than 5.

16 Claims, No Drawings

(56) References Cited

U.S. PATENT DOCUMENTS

| | | | |
|---|---|---|---|
| 6,084,045 | A | 7/2000 | Fornasari et al. |
| 6,423,666 | B1 * | 7/2002 | Liao .................. B01J 20/261 |
| | | | 210/198.2 |
| 7,316,919 | B2 | 1/2008 | Childs et al. |
| 7,604,746 | B2 * | 10/2009 | Childs ................ B01D 61/362 |
| | | | 210/490 |
| 2004/0203149 | A1 | 10/2004 | Childs et al. |
| 2005/0261384 | A1 | 11/2005 | Rasmussen et al. |
| 2005/0261385 | A1 | 11/2005 | Rasmussen et al. |
| 2008/0216942 | A1 | 9/2008 | Hiraoka et al. |
| 2008/0264867 | A1 | 10/2008 | Mika et al. |
| 2009/0313813 | A1 | 12/2009 | Sato et al. |
| 2011/0070469 | A1 | 3/2011 | Broer et al. |
| 2012/0248030 | A1 | 10/2012 | Antheunis et al. |
| 2012/0248032 | A1 | 10/2012 | Van Berchum et al. |
| 2012/0259027 | A1 | 10/2012 | Van Berchum et al. |

FOREIGN PATENT DOCUMENTS

| | | |
|---|---|---|
| JP | 2009084337 A | 4/2009 |
| WO | 2005076396 A1 | 8/2005 |
| WO | 2007018425 A1 | 2/2007 |

\* cited by examiner

DEVICES INCLUDING A MEMBRANE FORMED FROM A CURABLE COMPOSITION

RELATED APPLICATIONS

This application is a divisional of U.S. patent application Ser. No. 14/603,524, filed Jan. 23, 2015, now U.S. Pat. No. 9,259,685, which is a divisional of U.S. patent application Ser. No. 13/516,429, filed Jun. 15, 2012, now U.S. Pat. No. 8,968,965, which is a continuation of PCT Application number PCT/GB2010/052063, filed Dec. 9, 2010, which claims priority to GB Patent Application number 0921951.0, filed Dec. 16, 2009; each of which are hereby incorporated by reference in their entireties for all purposes.

This invention relates to curable compositions, to their use in the preparation of membranes and to the use of such membranes in ion exchange processes.

Ion exchange membranes are useful in a number of applications, including electrodeionisation (EDI), continuous electrodeionisation (CEDI), electrodialysis (ED), electrodialysis reversal (EDR) and capacitive deionisation used in e.g. flow through capacitors (FTC) for the purification of water, Donnan or diffusion dialysis (DD) for e.g. fluoride removal or the recovery of acids, pervaporation for dehydration of organic solvents, fuel cells, electrolysis (EL) of water or for chlor-alkali production, and reverse electrodialysis (RED) where electricity is generated from two streams differing in salt concentration separated by an ion-permeable membrane.

Electrodeionization (EDI) is a water treatment process wherein ions are removed from aqueous liquids using a membrane and an electrical potential to effect ion transport. It differs from other water purification technologies, such as conventional ion exchange, in that it is does not require the use of chemicals such as acids or caustic soda. EDI can be used to produce ultra pure water.

Electrodialysis (ED) and Electrodialysis Reversal (EDR) are electrochemical separation processes that remove ions and other charged species from water and other fluids. ED and EDR use small quantities of electricity to transport these species through membranes composed of ion exchange material to create separate purified and concentrated streams. Ions are transferred through the membranes by means of direct current (DC) voltage and are removed from the feed fluid as the current drives the ions through the membranes to desalinate the process stream. ED and EDR are suitable techniques for producing drinking water. Ion exchange membranes are also used in Zero Discharge Desalination (ZDD).

A membrane electrode assembly (MEA) appears suitable for a variety of applications such as electrolysis, sensors and especially fuel cells.

A flow through capacitor (FTC) is an efficient means of chemical-free Total Dissolved Solids (TDS) reduction using electrically charged carbon electrodes to remove ions.

One of the important problems in the production of ion exchange membranes is how to provide thin membranes with minimal defects. Desirably the membranes have good permselectivity and low electrical resistance. Additionally the membranes are desired to be strong, while at the same time being flexible. Flexibility is required for membranes which are to be wound into tight circumferential structures. The membranes also need to retain their physical integrity over an extended period of time. Desirably the method used to prepare the membranes does not result in excessive curl.

It is also desirable for the membranes to be resistant to the chemicals that they can come into contact with, e.g. resistant to hydrolysis.

Membrane users require the lowest prices available, which means production processes for the membranes are ideally inexpensive and the membranes should be easily capable of mass production.

U.S. Pat. No. 5,037,858 describes the preparation of anion selective membranes from concentrated solutions of N,N'-methylenebisacrylamide at high pH. The pH of the composition used in Example 1 is about 13.5 and it is free from non-curable salts.

US 2004/0203149 describes composite materials comprising supported macroporous gels. In Example 1 a composition comprising a crosslinker (N,N'-methylenebisacrylamide crosslinker), a curable ionic compound ((3-acrylamidopropane) trimethylammonium chloride), solvent and a photoinitiator is crosslinked to form a macroporous gel. The gel is described as being mechanically very weak. The composition was free from non-curable salts.

The present invention seeks to provide compositions suitable for use in the preparation of membranes, in addition to rapid processes for preparing the membranes and the membranes prepared by the processes and their uses.

According to a first aspect of the present invention there is provided a curable composition comprising:
(i) 2.5 to 50 wt % crosslinker comprising at least two acrylamide groups;
(ii) 12 to 65 wt % curable ionic compound comprising an ethylenically unsaturated group and an cationic group; and
(iii) 10 to 70 wt % solvent;
(iv) 0 to 10 wt % of free radical initiator; and
(v) non-curable salt;
wherein the molar ratio of (i):(ii) is >0.10.

The compositions of the present invention have good storage stability and membranes produced therefrom are also have good permselectivity and resistance to hydrolysis, even under alkaline conditions. This storage stability is particularly useful for the continuous production of membranes where large storage tanks of the composition can be at the production line for some time, or in storage waiting to replace a nearly spent tank. Additionally the compositions have a low tendency to corrode membrane production equipment such as tanks and piping. The burst strength of many of the membranes was also good.

In one embodiment the composition has a pH of 1 to 12, more preferably 1.5 to 11, especially 2 to 10, more especially 3 to 9, particularly 4 to 8, e.g. 4 to 5 or 5 to 7. In another embodiment the composition does not have a pH of 1 to 12.

In one embodiment the composition is free from free radical initiators or further comprises 0.005 to 10 wt % of photoinitiator.

The crosslinker is preferably present in the composition in an amount of 3 to 45 wt %, more preferably 4 to 35 wt % and especially 5 to 25 or 35 wt %. A relatively high crosslinker content generally results in a high permselectivity with a high electrical resistance while for a relatively low crosslinker content the formed membrane structure is more open resulting in a somewhat lower permselectivity. A relatively low crosslinker content allows for a higher content of curable ionic compounds and a higher degree of swelling both of which can be useful for obtaining a membrane having low electrical resistance. The ratio of crosslinker/curable ionic compound is selected depending on the desired properties for the resulting membrane which in turn depend on the intended use of the membrane.

When a membrane having low electrical resistance is desired, the amount of curable ionic monomer used in the composition is preferably high, while the amount of crosslinker will be reduced in order to accommodate the higher amount of curable ionic monomer. Thus to prepare membranes having low electrical resistance the preferred crosslinker content is 4 to 20 wt %, more preferably 6 to 18 wt %, especially 7 to 15 wt %, more especially about 10 wt %. With this amount of crosslinker one can still obtain a reasonably strong membrane with a good permselectivity without excessive swelling. When a membrane having very high permselectivity is desired the amount of crosslinker present in the composition will generally be chosen higher, preferably in an amount of 8 to 48 wt %, more preferably from 10 to 35 wt %, e.g. of 12 to 30 wt %.

The crosslinker preferably has two or three acrylamide groups, more preferably two acrylamide groups.

The molecular weight of the crosslinker preferably satisfies the equation:

$$(Y \times m) > \text{molecular weight of the crosslinker}$$

wherein m is the number of acrylamide groups in the crosslinker; and

Y is 120, preferably 105, more preferably 90 and especially 85 or 77.

The lower values of Y mentioned above are preferred because the resultant crosslinkers crosslink more efficiently than when Y is higher. Furthermore, crosslinkers having the lower values of Y mentioned above have lower molecular weights, leaving room for higher amounts of curable ionic compound and thereby achieving a lower electrical resistance for the same level of crosslinking and permselectivity.

The crosslinker is preferably of the Formula (1):

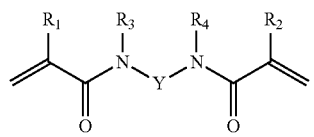

Formula (1)

wherein:
  $R_1$ and $R_2$ are each independently H or methyl;
  $R_3$ and $R_4$ are each independently H, alkyl, $R_3$ and $R_4$ together with the N groups to which they are attached and Y form an optionally substituted 6- or 7-membered ring; and
  Y is an optionally substituted and optionally interrupted alkylene group.

When $R_3$ or $R_4$ is alkyl it is preferably $C_{1-4}$-alkyl.

When $R_3$ and $R_4$ together with the N groups to which they are attached and Y form an optionally substituted 6- or 7-membered ring they preferably form a piperazine, homopiperazine or triazine ring.

The optional interruptions which may be present in Y are preferably ether or, more preferably, amino groups. Y is preferably of the formula $-(C_nH_{2n})-$ wherein n is 1, 2 or 3.

As Examples of suitable crosslinkers there may be mentioned N,N'-methylene bis(meth) acrylamide, N,N'-ethylenebis(meth)acrylamide, N,N'-propylenebis(meth)acrylamide, N,N'-butylenebis(meth)acrylamide, N,N'-(1,2-dihydroxyethylene) bis-(meth)acrylamide, 1,4-diacryoyl piperazine, 1,4-bis(acryloyl)homopiperazine, triacryloyl-tris(2-aminoethyl)amine, triacroyl diethylene triamine, tetra acryloyl triethylene tetramine, 1,3,5-triacryloylhexahydro-1,3,5-triazine and/or 1,3,5-trimethacryloylhexahydro-1,3,5-triazine. The term '(meth)' is an abbreviation meaning that the 'meth' is optional, e.g. N,N'-methylene bis(meth) acrylamide is an abbreviation for N,N'-methylene bis acrylamide and N,N'-methylene bis methacrylamide.

More preferably $R_3$ and $R_4$ are both H and Y is an optionally substituted $C_{1-3}$-alkylene group or an optionally substituted $-(C_{1-3}\text{-alkylene-N}(R_5)-C_{1-3}\text{-alkylene})-$ group wherein $R_5$ is H or $C_{1-4}$-alkyl. Especially preferred crosslinkers are N,N'-methylene bis(meth) acrylamide, N,N'-ethylenebis(meth)acrylamide, N,N'-propylenebis(meth) acrylamide, N,N'-(1,2-dihydroxyethylene) bis-(meth) acrylamide, triacryloyl-tris(2-aminoethyl)amine and triacroyl diethylene triamine.

The presence of non-curable salts in the composition can help to dissolve poorly soluble crosslinkers and provide surprisingly stable compositions, even with poorly soluble crosslinkers such as N,N'-methylene bis(meth) acrylamide.

The non-curable salt can be any salt which is not capable of forming a covalent bond with the crosslinker under the conditions used to cure the composition. Typically the non-curable salt comprises an anionic group derived from an acid (especially an inorganic acid) and a cationic group (especially and inorganic cationic group). The non-curable salt preferably has a solubility in water at 25° C. of at least 250 g/L, more preferably at least 400 g/L. Preferred non-curable salts are inorganic salts, for example inorganic lithium, sodium, potassium, ammonium, magnesium and calcium salts and mixtures comprising two or more such salts.

In one embodiment the curable composition is free from lithium and calcium salts. In another embodiment the curable composition comprises a lithium and/or calcium salt.

Preferred non-curable salts include lithium chloride, lithium bromide, lithium nitrate, lithium iodide, lithium chlorate, lithium thiocyanate, lithium perchlorate, lithium tetrafluoroborate, lithium hexafluorophosphate, lithium hexafluoroarsenate, ammonium thiocyanate, ammonium chloride, ammonium iodide, ammonium nitrate, sodium chloride, sodium bromide, sodium nitrate, sodium thiocyanate, calcium nitrate, calcium thiocyanate, calcium bromide, calcium chlorate, calcium perchlorate, calcium iodide, calcium tetrafluoroborate, calcium hexafluorophosphate, calcium hexafluoroarsenate, magnesium chloride, magnesium bromide, magnesium nitrate, magnesium thiocyanate, potassium thiocyanate, potassium chlorate, and mixtures comprising two or more such salts. Most preferred are lithium chloride, lithium bromide, lithium nitrate, ammonium nitrate, sodium nitrate, calcium nitrate and mixtures comprising two or more such salts.

The non-curable salts preferably comprise a chaotropic anion (i.e. weakly hydrated anion), while the cation is preferably kosmotropic. The preferred chaotropic anions are those low in the Hofmeister series as can be experimentally determined by the order by their elution rate from a packed column comprising epichlorohydrin crosslinked dextran gel in beaded form (e.g. Sephadex® G-10) as described in detail in J. Biol. Chem., 261, 12477-12485 (1986). Preferred chaotropic anions are those that elute slower than or equal to chloride, e.g. thiocyanate, chlorate, perchlorate, chlorite, iodide, bromide, nitrate, chloride and nitrite. The anion preferably is other than sulphate, sulphite, phosphate and fluoride.

The non-curable salt preferably has a relatively low molecular weight (e.g. below 200, more preferably below 150, especially below 110, more especially below 90, even more especially below 70. Any waters of crystallisation, when present, are not taken into account when calculating the molecular weight of the non-curable salt.

The curable composition preferably comprises 2 to 50 wt %, more preferably 2 to 30 wt % non-curable salt. Thus in a preferred embodiment the composition comprises the above-specified number of parts of (i), (iii) and (iv), 20 to 65 wt % of component (ii) and 2 to 30 wt % of component (v).

In many cases the presence of the non-curable salt in the composition can also improve the permselectivity of membranes made therefrom.

When the crosslinker has low solubility in the solvent (e.g. a solubility of below 2 wt %, the composition preferably comprises the non-curable salt in an amount of 3 to 40 wt %, more preferably 4 to 30 wt %, especially 7 to 25 wt %, e.g. about 10 wt %, or 15 to 35 wt %. The preferred amount depends to some extent on the molecular weight of the non-curable salt and the amount of crosslinker present in the composition.

Preferably the ratio of the number of moles of cations being part of the non-curable salt to the total number of moles of (meth)acrylamide bonds in the composition (including the crosslinker and optionally other curable monomers) is 0.3 to 1.1, more preferably 0.4 to 1.05, especially 0.7 to 1.02, e.g. about 0.9. Surprisingly the presence of the non-curable salt can provide the composition with advantages even when the crosslinker has good solubility in the solvent, e.g. improved permselectivity and a more robust membrane.

Preferably the crosslinker has a solubility of at least 2 wt % in a 10 wt % $LiNO_3$ solution in water at 20° C.

The curable ionic compound is preferably present in the composition in an amount of 20 or 25 to 65 wt %, more preferably 35 to 60 wt %, especially 40 to 57 wt % and more especially 45 to 55 wt %. In general the amount of curable ionic compound is as high as possible to maximise the electrical charge density in the membrane.

Preferably the molar ratio of component (i):(ii) is at least 0.15, more preferably at least 0.2, especially at least 0.25. In one embodiment the molar ratio of component (i):(ii) is preferably below 5.0, more preferably below 4.0, especially below 1.5, more especially below 1.0 In another embodiment the molar ratio of component (i):(ii) is preferably below 1.5, more preferably below 1.0, especially below 0.7, more especially below 0.5. Preferred curable ionic compounds comprise a quaternary ammonium group. Examples of such compounds include (3-acrylamidopropyl)trimethylammonium chloride, 3-methacrylamidopropyl trimethyl ammonium chloride, (ar-vinylbenzyl) trimethylammonium chloride, (2-(methacryloyloxy)ethyl)trimethylammonium chloride, [3-(methacryloylamino)propyl] trimethyl ammonium chloride, (2-acrylamido-2-methylpropyl) trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof.

When the crosslinker has a solubility of below 2 wt % in a 10 wt % $LiNO_3$ solution in water at 20° C., the total wt % of components (i)+(ii) relative to the total weight of the composition is preferably 30 to 90 wt %, more preferably 30 to 88 or 90 wt %, especially 35 to 80 wt %, more especially 40 to 80 wt %, e.g. about 50 wt % or about 55 wt %.

When the crosslinker has a solubility of at least 2 wt % in a 10 wt % $LiNO_3$ solution in water at 20° C., the total wt % of components (i)+(ii) is preferably 40 to 85 wt %, more preferably 45 to 80 wt %, especially 55 to 80 wt %, e.g. about 60 wt % or about 65 wt %. If one wishes to avoid swelling of the membrane and lower permselectivity the total wt % of components (i)+(ii) is preferably above 30 wt %.

The curable composition may comprise one or more than one crosslinker as component (i). In this case, the above-mentioned solubilities refer to the solubility of the overall mixture of crosslinkers. In a particularly preferred embodiment component (i) consists of crosslinking agent(s) having two acrylamide groups and component (ii) consists of curable ionic compound(s) having one ethylenically unsaturated group and one or more cationic group(s). Preferably the ethylenically unsaturated group in component (ii) is a (meth)acrylamide group because this can result in membranes having particularly good resistance to hydrolysis. The most preferred curable ionic compound is 3-acrylamidopropyl trimethylammonium chloride.

Generally component (i) provides resistance to swelling for the membrane, while potentially reducing flexibility.

When component (ii) has only one ethylenically unsaturated group (e.g. one $H_2C=CHCON<$ group) it is unable to crosslink. However it is able to react with component (i). Component (ii) with only one ethylenically unsaturated can provide the resultant membrane with a desirable degree of flexibility, which is particularly useful in applications requiring tightly wound membranes. Component (ii) also assists the membrane in distinguishing between ions of different charges by providing cationic groups.

In one embodiment the composition comprises less than 10 wt %, more preferably less than 5 wt %, of ethylenically unsaturated compounds other than components (i) and (ii). In a preferred embodiment the composition is free from ethylenically unsaturated compounds other than components (i) and (ii).

The solvent content of the composition is preferably the minimum, or less than 5% more than the minimum, necessary to achieve the composition in the form of a homogeneous solution, while at the same time being at least 15 wt %.

Polar solvents, especially aqueous solvents, are preferred because these are particularly good at dissolving the curable ionic compound. Preferably at least half of the solvent is water, with the balance comprising organic solvent. The organic solvent can be useful for providing a homogenous solution of all the components of the composition. The inclusion of an organic solvent may also have advantages in the process for preparing the membrane because many organic solvents will usefully reduce the viscosity and/or surface tension of the composition, making the manufacturing process easier in some respects. Preferably the solvent comprises at least 40 wt % water, more preferably at least 60 wt % water. Preferably the composition comprises 15 to 55 wt %, more preferably 16 to 45 wt %, especially 20 to 40 wt % and more especially 22 to 35 wt % solvent.

The solvent is preferable water or a mixture comprising water and a water-miscible organic solvent. Due to the presence of a water-miscible organic solvent, water-immiscible solvents may also be tolerated in small amounts such that the overall solvent mixture is miscible.

When the solvent comprises water and an organic solvent the weight ratio of water:organic solvent is preferably higher than 2:3, more preferably between 10:1 and 1:1, more preferably between 10:1 and 1:2, especially between 5:1 and 1:1 and more especially between 3:1 and 2:1.

The organic solvent is optionally a single organic solvent or a combination of two or more organic solvents.

Preferred organic solvents include $C_{1-4}$ alcohols (e.g. methanol, ethanol and propan-2-ol), diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), dimethyl formamide, acetone, N-methyl-2-pyrrolidinone and mixtures comprising two or more thereof. A particularly preferred organic solvent is propan-2-ol.

In one embodiment the organic solvent has a low boiling point e.g. a boiling point below 100° C. Solvents having a low boiling point can be easily removed by evaporation, avoiding the need for a washing step for removal of the solvent.

The optimum solvent content for the curable composition depends to some extent on the interaction between the solvent, the curable compound(s) and the crosslinker, and can be determined for each combination by simple experimentation.

When the composition contains 0% free radical initiator it may be cured using electron beam radiation.

Preferably the composition comprises 0.01 to 10 wt %, more preferably 0.01 to 5 wt %, especially 0.01 to 2 wt %, more especially 0.05 to 2 wt % free radical initiator. The preferred free radical initiator is a photoinitiator.

The curable composition may comprise one or more than one free radical initiator as component (iv).

For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

The curable composition optionally contains (vi) 0 to 10 wt %, preferably 0 to 5 wt %, of curable compound(s) other than (i) which have more than one ethylenically unsaturated group and no ionic groups.

The curable composition optionally contains (vii) 0 to 20 wt %, preferably 0 to 10 wt %, of curable compound(s) having one ethylenically unsaturated group and no ionic groups.

When a radical initiator is present in the composition, preferably a polymerization inhibitor is also included. This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510 and mixtures comprising two or more thereof.

The curable composition may contain other components, for example acids, pH controllers, preservatives, viscosity modifiers, stabilisers, dispersing agents, antifoam agents, organic/inorganic salts, anionic, cationic, non-ionic and/or amphoteric surfactants, buffers and the like.

A buffer may be used to reduce fluctuations in pH value caused by variation in concentrations of acidic and basic compounds.

The curable composition may of course contain further components not specifically mentioned or excluded above.

Curing rates may be increased by including an amine synergist in the curable composition. Suitable amine synergists are, for example, free alkyl amines, e.g. triethylamine or triethanol amine; aromatic amines, e.g. 2-ethylhexyl-4-dimethylaminobenzoate, ethyl-4-dimethylaminobenzoate and also polymeric amines as polyallylamine and its derivatives.

Curable amine synergists such as ethylenically unsaturated amines (e.g. acrylated amines) are preferable since their use will give less odour due to their ability to be incorporated into the membrane by curing and also because they may contain a basic group which can be useful in the final (anion permeable) membrane.

When used the amount of amine synergists is preferably from 0.1 to 10 wt. % based on the total weight of polymerisable components in the composition, more preferably from 0.3 to 3 wt %.

In view of the foregoing a particularly preferred composition comprises a curable composition comprising:
(i) 4 to 35 wt % crosslinker comprising at least two acrylamide groups;
(ii) 35 to 60 wt % curable ionic compound comprising an ethylenically unsaturated group and an cationic group; and
(iii) 16 to 45 wt % solvent;
(iv) 0.01 to 2 wt % of photoinitiator;
(v) 2 to 30 wt % of non-curable salt;
wherein the molar ratio of (i):(ii) is at least 0.15 and preferably below 1.5. More preferably the molar ratio of (i):(ii) is between 0.2 and 1.0.

In an alternative embodiment the curable composition comprising:
(i) 5 to 35 wt % crosslinker comprising at least two acrylamide groups;
(ii) 20 to 65 wt % curable ionic compound comprising an ethylenically unsaturated group and an cationic group; and
(iii) 16 to 45 wt % solvent;
(iv) 0.01 to 2 wt % of photoinitiator;
(v) 3 to 40 wt % of non-curable salt;
wherein the molar ratio of (i):(ii) is between 0.10 and 5. Preferably the molar ratio of (i):(ii) is between 0.15 and 1.5; more preferably the molar ratio of (i):(ii) is between 0.2 and 1.0.

The optimum amounts of all components depends to some extent on the properties of the individual components selected and on the intended use of the composition.

Preferably this composition has a pH of 1.5 to 11.

Preferably the ethylenically unsaturated group is an (meth)acrylamide group.

Preferably the number of parts of (i), (ii), (iii), (iv) and (v) in the aforementioned curable compositions add up to 100. This does not rule out the presence of further, different components, but merely sets the ratio of the mentioned components relative to the total mount of such components.

Preferably the curable composition is free from, or substantially free from, methacrylic compounds (e.g. methacrylate and methacrylamide compounds), i.e. the composition comprises at most 10 wt % of compounds which are free from acrylic groups and comprise one or more methacrylic groups.

Preferably the curable composition is free from, or substantially free from, divinyl benzene.

Preferably the curable composition is free from, or substantially free from, styrene.

Preferably the curable composition is free from, or substantially free from, dyes and pigments. This is because there is no need to include dyes or pigments in the composition.

Thus the preferred curable composition is free from, or substantially free from, divinyl benzene, dyes, pigments, styrene, methacrylic compounds and compounds having sulpho groups.

According to a second aspect of the present invention there is provided a process for preparing a membrane comprising the following steps:
(i) applying a curable composition to a support; and
(ii) curing the composition to form a membrane;
wherein the curable composition is as defined in the first aspect of the present invention.

Hitherto such membranes have often been made in slow and energy intensive processes, often having many stages. The present invention enables the manufacture of membranes in a simple process that may be run continuously for long periods of time to mass produce membranes relatively cheaply.

Optionally the process comprises the further step of separating the cured composition and support. However if desired this further step may be omitted and thereby a composite membrane is produced comprising the cured composition and a porous support.

The membrane is preferably a cation exchange membrane.

The thickness of the membrane, including the support, is preferably less than 250 μm, more preferably between 10 and 200 μm, most preferably between 20 and 150 μm.

Preferably the membrane has an ion exchange capacity of at least 0.1 meq/g, more preferably of at least 0.3 meq/g, especially more than 0.6 meq/g, more especially more than 1.0 meq/g, based on the total dry weight of the membrane and any porous support and any porous strengthening material which remains in contact with the resultant membrane. Ion exchange capacity may be measured by titration as described by Djugolecki et al, J. of Membrane Science, 319 (2008) on page 217.

Preferably the membrane has a permselectivity for small anions (e.g. Cl$^-$) of more than 80%, especially more than 85% or more especially more than 90%, e.g. more than 95%.

Preferably the membrane has an electrical resistance less than 10 ohm·cm$^2$, more preferably less than 5 ohm·cm$^2$, most preferably less than 3 ohm·cm$^2$. For certain applications a high electrical resistance may be acceptable especially when the permselectivity is very high, e.g. 90% or higher. The electrical resistance may be determined by the method described below in the examples section.

Preferably the membrane exhibits a swelling in water of less than 100%, more preferably less than 75%, most preferably less than 60%. The degree of swelling can be controlled by the amount of crosslinker, the amount of non-curable salts and by selecting appropriate parameters in the curing step and further by the properties of the porous support.

Electrical resistance, permselectivity and % swelling in water may be measured by the methods described by Djugolecki et al, J. of Membrane Science, 319 (2008) on pages 217-218.

Typically the ion exchange membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm.

The resultant membrane preferably has a low water permeability so that ions may pass through the membrane and water molecules do not pas through the membrane. Preferably the membrane's water permeability is lower than $1·10^{-7}$ m$^3$/m$^2$·s·kPa, more preferably lower than $1·10^{-8}$ m$^3$/m$^2$·s·kPa, most preferably lower than $5·10^{-9}$ m$^3$/m$^2$·s·kPa, especially lower than $1·10^{-9}$ m$^3$/m$^2$·s·kPa. The requirements for water permeability depend on the intended use of the membrane.

Where desired, a surfactant or combination of surfactants may be included in the composition as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferably the components of the curable composition are selected such that no phase separation occurs during the curing step. In this way, the likelihood of a macro porous structure in the resultant membrane is reduced.

The network structure of the membrane is determined to some extent by the identity of the crosslinking agent(s) and the curable compound and their functionality, e.g. the number of crosslinkable groups they contain per molecule.

During the curing process, the curable composition may form a layer on top of the support, or it may permeate wholly or partially into the pores of the support and thus forming an impregnated composite membrane. The curable composition may also be applied to both sides of the support to achieve a symmetrical composite membrane. In a preferred embodiment the support is saturated with the composition and the saturated support is cured by EB or UV irradiation.

The process of the present invention may contain further steps if desired, for example washing and/or drying the resultant membrane.

Before applying the curable composition to the surface of the support, the support may be subjected to a corona discharge treatment, plasma glow discharge treatment, flame treatment, ultraviolet light irradiation treatment, chemical treatment or the like, e.g. for the purpose of improving its wettability and the adhesiveness.

The support may also be treated to modify its surface energy, e.g. to values above 70 mN/m.

While it is possible to prepare the membrane on a batch basis using a stationary support, to gain full advantage of the invention it is much preferred to prepare the membrane on a continuous basis using a moving support. The support may be in the form of a roll which is unwound continuously or the support may rest on a continuously driven belt (or a combination of these methods). Using such techniques the curable composition can be applied to the support on a continuous basis or it can be applied on a large batch basis.

The curable composition may be applied to the support by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The coating of multiple layers can be done simultaneously or consecutively. When coating multiple layers the curable compositions may be the same of different. For simultaneous coating of multiple layers, curtain coating, slide coating and slot die coating are preferred. The curable composition may be applied to one side of the support or to both sides of the support.

In one embodiment at least two of the curable compositions, which may be the same or different, are applied to the support, e.g. simultaneously or consecutively. The curable compositions may be applied to the same side of the support or to different sides. Thus the application step may be performed more than once, either with or without curing being performed between each application. When applied to different sides the resultant composite membrane may be symmetrical or asymmetrical and the layers of curable composition may have the same or different thicknesses. When applied to the same side a composite membrane may be formed comprising at least one top layer and at least one bottom layer that is closer to the support than the top layer. In this embodiment the top layer and bottom layer, together with any intervening layers, constitute the membrane and the porous support provides strength to the resultant composite membrane.

Thus in a preferred process, the curable composition is applied continuously to a moving support, more preferably by means of a manufacturing unit comprising one or more curable composition application stations, one or more irradiation sources for curing the composition, a membrane collecting station and a means for moving the support from the curable composition application station to the irradiation source and to the membrane collecting station.

The curable composition application station(s) may be located at an upstream position relative to the irradiation source(s) and the irradiation source(s) is/are located at a an upstream position relative to the membrane collecting station.

In order to produce a sufficiently flowable curable composition for application by a high speed coating machine, it is preferred that the curable composition has a viscosity below 5000 mPa·s when measured at 35° C., more preferably from 1 to 1500 mPa·s when measured at 35° C. Most preferably the viscosity of the curable composition is from 2 to 500 mPa·s when measured at 35° C. For coating methods such as slide bead coating the preferred viscosity is from 2 to 150 mPa·s when measured at 35° C.

With suitable coating techniques, the curable composition may be applied to a support moving at a speed of over 5 m/min, preferably over 10 m/min, more preferably over 15 m/min, e.g. more than 20 m/min, or even higher speeds, such as 60 m/min, 120 m/min or up to 400 m/min can be reached.

Curing is preferably performed by radical polymerisation, preferably using electromagnetic radiation. The source of radiation may be any source which provides the wavelength and intensity of radiation necessary to cure the composition. A typical example of a UV light source for curing is an D-bulb with an output of 600 Watts/inch (240 W/cm) as supplied by Fusion UV Systems. Alternatives are the V-bulb and the H-bulb from the same supplier.

When no photo-initiator is included in the curable composition, the composition can be cured by electron-beam exposure, e.g. using an exposure of 50 to 300 keV. Curing can also be achieved by plasma or corona exposure During curing the components (i) and (ii) polymerise to form a polymeric membrane. The curing may be brought about by any suitable means, e.g. by irradiation and/or heating. Preferably curing occurs sufficiently rapidly to form a membrane within 30 seconds. If desired further curing may be applied subsequently to finish off, although generally this is not necessary.

The curing is preferably achieved thermally (e.g. by irradiating with infrared light) or, more preferably, by irradiating the composition with ultraviolet light or an electron beam.

For thermal curing the curable composition preferably comprises one or more thermally reactive free radical initiators, preferably being present in an amount of 0.01 to 5 parts per 100 parts of curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. $\alpha,\alpha'$-azobisisobutyronitrile and/or $\gamma,\gamma'$-azobis($\gamma$-cyanovaleric acid); persulfates; peracetates, e.g. methyl peracetate and/or tert-butyl peracetate; peroxalates, e.g. dimethyl peroxalate and/or di(tert-butyl) peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably curing of the curable composition begins within 3 minutes, more preferably within 60 seconds, after the composition has been applied to the support.

Preferably the curing is achieved by irradiating the curable composition for less than 30 seconds, more preferably less than 10 seconds, especially less than 3 seconds, more especially less than 2 seconds. In a continuous process the irradiation occurs continuously and the speed at which the curable composition moves through the beam of irradiation is mainly what determines the time period of curing.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photo-initiator included in the curable composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 1500 mJ/cm$^2$, most preferably between 70 and 900 mJ/cm$^2$ as measured by an High Energy UV Radiometer (UV PowerMap™ from EIT, Inc) in the UV-A and UV-B range indicated by the apparatus. Exposure times can be chosen freely but preferably are short and are typically less than 10 seconds, more preferably less than 5 seconds, especially less than 3 seconds, more especially less than 2 seconds, e.g. between 0.1 and 1 second.

To reach the desired exposure dose at high coating speeds, more than one UV lamp may be used, so that the curable composition is irradiated more than once. When two or more lamps are used, all lamps may give an equal dose or each lamp may have an individual setting. For instance the first lamp may give a higher dose than the second and following lamps or the exposure intensity of the first lamp may be lower. Varying the exposure dose of each lamp may influence the polymer matrix structure and the final crosslink density. In a preferred embodiment the composition is cured by simultaneous irradiation from opposite sides using two or more irradiation sources, e.g. two lamps (one at each side). The two or more irradiation sources preferably irradiate the composition with the same intensity. By using this symmetric configuration, a higher crosslinking efficiency can be achieved and curling of the membrane can be reduced or prevented.

Photoinitiators may be included in the curable composition, as mentioned above, and are usually required when curing uses UV or visible light radiation. Suitable photoinitiators are those known in the art. Curing by irradiation with UV or electron beam is preferably performed at between 20 and 60° C. While higher temperatures may be used, these are not preferred because they can lead to higher manufacturing costs.

Preferred supports are porous, e.g. they may be a woven or non-woven synthetic fabric, e.g. polyethylene, polypropylene, polyacrylonitrile, polyvinyl chloride, polyester, polyamide, and copolymers thereof, or porous membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof.

Various porous supports are available commercially, e.g. from Freudenberg Filtration Technologies (Novatexx materials) and Sefar AG.

Surprisingly, ion exchange membranes with cationic groups can exhibit good properties in terms of their permselectivity and conductivity while at the same time being not overly expensive to manufacture by the present process.

The present process allows the preparation of membranes having a desirable degree of flexibility, without being overly flexible or too rigid. The presence of the solvent improves coatability for the curable composition and can provide thin membranes with low numbers of defects, low tendency to curl while retaining good durability in use.

According to a third aspect of the present invention there is provided a membrane obtained by a process according to the second aspect of the present invention.

The membranes according to the third aspect of the present invention may also be put to other uses requiring membranes having cationic groups.

The membranes according to the third aspect of the present invention preferably have the properties described above in relation to the second aspect of the present invention.

The membranes of the invention are particularly useful for ED, (C)EDI, EDR, ZDD, FTC, DD, EL and RED, although they may also be used for other purposes (e.g. pervaporation, fuel cells).

According to a fourth aspect of the present invention there is provided use of a membrane according to the third aspect of the present invention for water purification or for the generation of electricity.

According to a fourth aspect of the present invention there is provided an electrodialysis or reverse electrodialysis unit, an electrodeionization module or a flow through capacitor comprising one or more membranes according to the third aspect of the present invention. The electrodeionization module is preferably a continuous electrodeionization module.

Preferably the electrodialysis or reverse electrodialysis unit or the electrodeionization module or the flow through capacitor comprises at least one anode, at least one cathode and one or more membrane according to the third aspect of the present invention. Further the unit preferably comprises an inlet for providing a flow of relatively salty water along a first side of a membrane according to the present invention and an inlet for providing a less salty flow water along a second side of the membrane such that ions pass from the first side to the second side of the membrane. Preferably the one or more membranes of the unit comprise a membrane according to the third aspect of the present invention having cationic groups and a further membrane having anionic groups.

In a preferred embodiment the unit comprises at least 3, more preferably at least 5, e.g. 36, 64 or up to 500, membranes according to the third aspect of the present invention, the number of membranes being dependent on the application. The membrane may for instance be used in a plate-and-frame or stacked-disk configuration or in a spiral-wound design. Alternatively, a continuous first membrane according to the present invention having cationic groups may be folded in a concertina (or zigzag) manner and a second membrane having anionic groups (i.e. of opposite charge to the first membrane) may be inserted between the folds to form a plurality of channels along which fluid may pass and having alternate anionic and cationic membranes as side walls.

The invention will now be illustrated with non-limiting examples where all parts and percentages are by weight unless specified otherwise.

In the examples the following properties were measured by the methods described below.

General Test Methods

Permselectivity was measured by using a static membrane potential measurement. Two cells are separated by the membrane under investigation. Prior to the measurement the membrane was equilibrated in a 0.1 M NaCl solution for at least 12 hours. Two streams having different NaCl concentrations were passed through cells on opposite sides of the membranes under investigation. One stream had a concentration of 0.1M NaCl (from Sigma Aldrich, min. 99.5% purity) and the other stream was 0.5 M NaCl. The flow rate of both streams was 0.90 dm$^3$/min. Two Calomel reference electrodes (from Metrohm AG, Switzerland) were connected to Haber-Luggin capillary tubes that were inserted in each cell and were used to measure the potential difference over the membrane. The effective membrane area was 3.14 cm$^2$ and the temperature was 25° C.

When a steady state was reached, the membrane potential was measured ($\Delta V_{meas}$)

The permselectivity ($\alpha$ (%)) of the membrane was calculated according the formula:

$$\alpha(\%) = \Delta V_{meas}/\Delta V_{theor} * 100\%.$$

The theoretical membrane potential ($\Delta V_{theor}$) is the potential for a 100% permselective membrane as calculated using the Nernst equation. To compensate for day-to-day measurement fluctuations, all $\alpha$ (%) measurements included an internal standard to normalize the results. The internal standard used was AMX membrane from Tokuyama Soda having an $\alpha$ (%) value of 92%.

Electrical resistance ("ER") was measured by the method described by Djugolecki et al, J. of Membrane Science, 319 (2008) on page 217-218 with the following modifications:
  the auxiliary membranes were CMX and AMX from Tokuyama Soda, Japan;
  double headed peristaltic pumps from Watson Marlow (type 504 S/50) were used for the four outer compartments and a Cole Parmer masterflex console drive (77521-47) with easy load II model 77200-62 gear pumps for the two central compartments;

the flowrate of each stream was 475 ml/min controlled by Porter Instrument flowmeters (type 150AV-B250-4RVS) and Cole Parmer flowmeters (type G-30217-90);

the effective area of the membrane was 3.14 cm².

Ingredients

MBA is N,N'-methylene bisacrylamide (MW=154) from Sigma Aldrich.

BAHP is 1,4-bis(acryloyl) homopiperazine, synthesized as described in WO 2010/106356

ATMAC is 3-acrylamidopropyl-trimethylammonium chloride from Kohjin

HDMAP is 2-hydroxy-2-methyl-1-phenyl-propan-1-one, a photoinitiator from Cytec.

MeHQ is hydroquinone monomethyl ether, a polymerisation inhibitor from Merck

IPA is 2-propanol from Shell.

MeOH and EtOH are methanol and ethanol (96%) respectively from Sigma Aldrich.

LiNO₃, LiBr and LiCl are lithium salts from Sigma Aldrich.

Novatexx™ 2597 is a nonwoven polyamide material from Freudenberg Filtration Technologies.

Novatexx™ 2426 is a nonwoven polyethyleneterephthalate material from Freudenberg Filtration Technologies.

When calculating the solvent content, the amount of any solvents present in any of the ingredients was included (e.g. any waters of crystallisation were treated as solvent).

EXAMPLES 1 TO 15 AND COMPARATIVE EXAMPLES 1 AND 2

Curable compositions CC1 to CC15 according to the invention and comparative curable compositions CE1 and CE2 were prepared by mixing the ingredients (expressed in wt %) shown in Table 1 at 80° C.

The curable compositions were applied to applied to an aluminium underground carrier using a 150 μm wire wound bar, at a speed of approximately 5 m/min by hand, followed by application of a non-woven support (Novatexx™ 2597) levelled using a wire wound rod coater to a thickness of 4 micrometers. The temperature of the curable compositions was 50° C. A membrane was prepared by curing the coated support using a Light Hammer LH6 from Fusion UV Systems fitted with a D-bulb working at 100% intensity with a speed of 30 m/min (single pass). The exposure time was 0.47 seconds. After curing, the membrane was stored in a 0.1 M NaCl solution for at least 12 hours.

The permselectivity ($\alpha$ (%)) and electrical resistivity (ER) of the resultant membranes were as shown in Table 1.

EXAMPLES 16 TO 19

Curable compositions CC16 to CC19 according to the invention were prepared by mixing the ingredients shown in an analogous manner to Examples 1 to 15 using the ingredients listed in Table 2.

TABLE 2

| Ingredient | CC16 | CC17 | CC18 | CC19 |
|---|---|---|---|---|
| ATMAC (ii) | 31 | 26 | 26 | 26 |
| MBA (i) | 21 | 18 | 18 | 18 |
| HDMAP | 1.0 | 1.0 | 1.0 | 1.0 |
| Water | 28 | 28 | 28 | 28 |
| IPA | 0 | 10 | 0 | 0 |
| MeOH | 0 | 0 | 10 | 0 |
| EtOH | 0 | 0 | 0 | 10 |
| LiCl | 19 | 17 | 17 | 17 |
| Molar ratio (i):(ii) | 0.91 | 0.93 | 0.93 | 0.93 |
| α (%) | 89.4 | 89.4 | 88.8 | 88.8 |
| ER (ohm · cm2) | 1.5 | 1.7 | 1.5 | 1.2 |

*The water included MeHQ polymerization inhibitor (ca. 1000 ppm).

CC16 to CC19 were applied to Novatexx™ 2426 support by the method described in Example 1.

TABLE 1

| Ingredient | CC1 | CC2 | CC3 | CC4 | CC5 | CC6 | CC7 | CC8 | CC9 | CC10 |
|---|---|---|---|---|---|---|---|---|---|---|
| ATMAC (ii) | 44.0 | 43.1 | 42.4 | 40.4 | 40.0 | 38.1 | 38.4 | 33.5 | 32.8 | 27.5 |
| MBA (i) | 5.1 | 6.3 | 6.8 | 8.8 | 9.9 | 10.6 | 10.6 | 12.5 | 15.8 | 16.7 |
| BAHP (i) | 0 | 0 | 0 | 0 | 0 | 0 | 0 | 0 | 0 | 0 |
| HDMAP | 1.0 | 1.0 | 1.0 | 1.0 | 0.7 | 1.0 | 1.0 | 0.9 | 0.9 | 0.8 |
| Water* | 30.7 | 30.0 | 29.4 | 28.5 | 20.6 | 27.6 | 27.7 | 24.9 | 25.3 | 30.8 |
| IPA | 0 | 0 | 0 | 0 | 8.4 | 0 | 0 | 0 | 0 | 0 |
| LiBr | 0 | 0 | 0 | 0 | 0 | 0 | 0 | 28.2 | 0 | 0 |
| LiNO₃ | 19.1 | 19.7 | 20.4 | 21.3 | 20.4 | 22.7 | 22.3 | 0 | 25.1 | 24.2 |
| Molar ratio (i):(ii) | 0.16 | 0.19 | 0.21 | 0.29 | 0.33 | 0.37 | 0.37 | 0.50 | 0.65 | 0.82 |
| α (%) | 86.2 | 86.5 | 89.9 | 89.5 | 88.0 | 88.0 | 91.0 | 90.6 | 90.0 | 87.4 |
| ER (ohm · cm²) | 0.48 | 0.37 | 1.43 | 0.91 | 1.15 | 1.48 | 1.02 | 0.92 | 1.14 | 4.15 |

| Ingredient | CC11 | CC12 | CC13 | CC14 | CC15 | CE1 | CE2 |
|---|---|---|---|---|---|---|---|
| ATMAC (ii) | 28.0 | 24.8 | 21.1 | 17.8 | 13.6 | 45.5 | 8.8 |
| MBA (i) | 19.0 | 19.0 | 21.8 | 0 | 0 | 2.4 | 0 |
| BAHP (i) | 0 | 0 | 0 | 40.7 | 43.6 | 0 | 47.1 |
| HDMAP | 1.0 | 0.8 | 0.8 | 1.7 | 1.9 | 1.3 | 2.0 |
| Water* | 24.0 | 29.7 | 29.0 | 36.4 | 37.3 | 33.0 | 38.2 |
| LiNO₃ | 28.0 | 25.7 | 27.3 | 3.4 | 3.6 | 17.8 | 3.9 |
| Molar ratio (i):(ii) | 0.91 | 1.03 | 1.39 | 2.27 | 3.19 | 0.07 | 5.32 |
| α (%) | 89.2 | 86.5 | 86.4 | 90.0 | 90.6 | 79.9 | 86.0 |
| ER (ohm · cm²) | 1.40 | 2.41 | 3.17 | 7.93 | 9.47 | 0.27 | 13.6 |

*The water included MeHQ polymerization inhibitor (ca. 1000 ppm).

The permselectivity (α (%)) and electrical resistivity (ER) of the resultant membranes were as shown above in Table 2.

The invention claimed is:

1. A device selected from the group consisting of an electrodialysis or reverse electrodialysis unit, an electrodeionization module and a flow through capacitor, the device comprising a membrane obtained from a process comprising the following steps:
   applying a curable composition to a support; and
   curing the composition to form a membrane;
   wherein the curable composition comprises:
   (i) 2.5 to 50 wt % crosslinker comprising at least two acrylamide groups;
   (ii) 12 to 65 wt % curable ionic compound comprising an ethylenically unsaturated group and a cationic group;
   (iii) 10 to 70 wt % solvent;
   (iv) 0 to 10 wt % of free radical initiator; and
   (v) non-curable salt comprising a cation and an anion, wherein the anion is not sulfate;
   wherein the molar ratio of (i):(ii) is greater than 0.10 and less than 5.

2. The device according to claim 1 wherein the device is an electrodialysis or reverse electrodialysis unit.

3. The device according to claim 2 which further comprises at least one anode and at least one cathode.

4. The device according to claim 3 which further comprises an inlet for providing a flow of salty water along a first side of the membrane and an inlet for providing a flow of a less salty water along a second side of the membrane such that ions pass from the first side to the second side of the membrane.

5. The device according to claim 1 wherein the device is a flow through capacitor.

6. The device according to claim 5 which further comprises at least one anode and at least one cathode.

7. The device according to claim 1 wherein the device is an electrodeionization module.

8. The device according to claim 7 which further comprises at least one anode and at least one cathode.

9. The device according to claim 1 wherein the composition comprises:
   (i) 5 to 35 wt % crosslinker comprising at least two acrylamide groups;
   (ii) 20 to 65 wt % curable ionic compound comprising an ethylenically unsaturated group and a cationic group; and
   (iii) 16 to 45 wt % solvent;
   (iv) 0.01 to 2 wt % of photoinitiator; and
   (v) 3 to 40 wt % of non-curable salt comprising a cation and an anion, wherein the anion is not sulfate;
   wherein the molar ratio of (i):(ii) is at least 0.15.

10. The device according to claim 9 wherein the device is an electrodialysis or reverse electrodialysis unit.

11. The device according to claim 10 which further comprises at least one anode and at least one cathode.

12. The device according to claim 11 which further comprises an inlet for providing a flow of salty water along a first side of the membrane and an inlet for providing a flow of a less salty water along a second side of the membrane such that ions pass from the first side to the second side of the membrane.

13. The device according to claim 9 wherein the device is a flow through capacitor.

14. The device according to claim 13 which further comprises at least one anode and at least one cathode.

15. The device according to claim 9 wherein the device is an electrodeionization module.

16. The device according to claim 15 which further comprises at least one anode and at least one cathode.

* * * * *